US012140094B2

(12) United States Patent
Disch et al.

(10) Patent No.: US 12,140,094 B2
(45) Date of Patent: Nov. 12, 2024

(54) METHOD AND DEVICE FOR OPERATING AN INTERNAL COMBUSTION ENGINE

(71) Applicant: Robert Bosch GmbH, Stuttgart (DE)

(72) Inventors: Christian Disch, Wimsheim (DE); Conrad Bubeck, Esslingen (DE); Stefan Bauer, Gerlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/593,408

(22) Filed: Mar. 1, 2024

(65) Prior Publication Data

US 2024/0309822 A1 Sep. 19, 2024

(30) Foreign Application Priority Data

Mar. 16, 2023 (DE) ..................... 10 2023 202 404.7

(51) Int. Cl.

*F02D 41/00* (2006.01)
*F01N 3/30* (2006.01)
*F02M 35/04* (2006.01)
*F02M 35/10* (2006.01)

(52) U.S. Cl.

CPC ......... *F02D 41/0002* (2013.01); *F01N 3/303* (2013.01); *F02M 35/04* (2013.01); *F02M 35/10209* (2013.01); *F02M 35/10262* (2013.01); *F02D 2200/04* (2013.01)

(58) Field of Classification Search

CPC ........ F01N 3/30; F01N 3/303; F02D 41/0002; F02M 35/1038

See application file for complete search history.

(56) References Cited

U.S. PATENT DOCUMENTS

2004/0020189 A1* 2/2004 Hirooka .................. F01N 3/303 60/284
2015/0211733 A1* 7/2015 Shibuya .................. F23D 11/44 431/350
2015/0361855 A1 12/2015 Görgen et al.
2020/0271046 A1* 8/2020 Kelly ...................... F02B 37/10

FOREIGN PATENT DOCUMENTS

DE 4410820 A1 10/1994
DE 19508013 C1 3/1996

* cited by examiner

*Primary Examiner* — Ngoc T Nguyen
(74) *Attorney, Agent, or Firm* — NORTON ROSE FULBRIGHT US LLP; Gerard A. Messina

(57) ABSTRACT

A method and a device for operating an internal combustion engine including a first air duct for supplying air to a cylinder and a second air duct for supplying air to a heater for heating an exhaust system. The first and second air ducts each have a control element for controlling the amount of air flowing through them and a mass flow sensor for measuring the amount of air flowing through them. The first and second air ducts are connected to a common air filter, for providing filtered ambient air of the internal combustion engine. A regulation of the amount of air flowing through the first and second air ducts takes place using the measurement signals, depending on operating states of the internal combustion engine. A mutual influence of the air flowing through the first or second air duct is taken into account.

8 Claims, 2 Drawing Sheets

METHOD AND DEVICE FOR OPERATING AN INTERNAL COMBUSTION ENGINE

CROSS REFERENCE

The present application claims the benefit under 35 U.S.C. § 119 of German Patent Application No. DE 10 2023 202 404.7 filed on Mar. 16, 2023, which is expressly incorporated herein by reference in its entirety.

FIELD

The present invention is based on a method and a device for operating an internal combustion engine.

BACKGROUND INFORMATION

German Patent No. DE 195 08 013 C1 describes an air supply to an internal combustion engine in which a first air duct and a second air duct are provided. Air is supplied through the first air duct to cylinders of the internal combustion engine. Air is supplied through a second air duct to a heater for heating an exhaust system of the internal combustion engine.

SUMMARY

A method according to the present invention for operating an internal combustion engine comprising a first air duct for supplying air to a cylinder of the internal combustion engine and a second air duct for supplying air to a heater for heating an exhaust system of the internal combustion engine may have an advantage that, by taking into account the mutual influence of the air flowing through the first or second air duct, the internal combustion engine can be controlled in an improved manner. Significantly more efficient combustions or lower pollutant loads by the combustion can thus be realized. The operation of an internal combustion engine is thus significantly improved.

Further advantages and improvements result from the measures of disclosed herein. In particular, the method according to the present invention can be used for different operating modes of the internal combustion engine. The accuracy of the regulation and the associated effort can thereby be adjusted. In particular, according to an example embodiment of the present invention, in order to precisely regulate the large amounts of air required for the operation of the cylinders, it is advantageous for the flow through the first air duct to provide different measuring functions for a second and a third operating mode. Due to the smaller amount of flowing air, the deviations in the flow through the second air duct are greater so that different measuring functions are useful in the first and second operating modes. A particularly good regulation of the internal combustion engine or the amount of air is achieved if a separate measuring function is used for each operating mode for both the first and the second air duct.

A device designed according to the present invention for operating an internal combustion engine is particularly suitable for operating the internal combustion engine since the advantages of the method according to the present invention are thus realized.

An air system adapted according to the present invention makes it possible from the outset to minimize the mutual influence by the first and second air ducts. In particular, an arrangement of the first and second air ducts as a parallel arrangement of the longitudinal extents has proven to be a measure that keeps a mutual influence low.

BRIEF DESCRIPTION OF THE DRAWINGS

Exemplary embodiments of the present invention are illustrated in the figures and explained in more detail in the description below.

FIG. 1 shows an internal combustion engine in which air is being supplied to the cylinders of the internal combustion engine and a heater for heating the exhaust system of the internal combustion engine is switched on.

DETAILED DESCRIPTION OF EXAMPLE EMBODIMENTS

Figure 1:
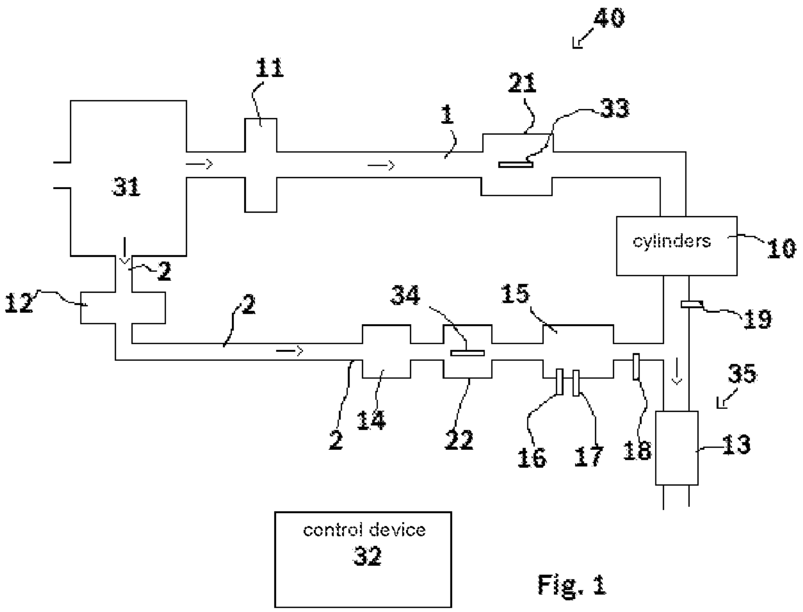

FIG. 1 schematically shows an internal combustion engine 40 with an air supply with a first air duct 1 and a second air duct 2. The air duct 1 is connected to an air filter 31. The air duct 2 is likewise connected to the air filter 31. The air filter consists of a housing with an air supply and a filter element (not shown here), which retains particles from the ambient air. Through the air supply, ambient air of the internal combustion engine flows through the filter element and provides the filtered ambient air for the operation of the internal combustion engine 40, both for the cylinders 10 and for the heater 15 through the first and second air ducts 1, 2.

Starting from the air filter 31, a sensor element 11, a throttle valve 21, and then at least one cylinder 10 are arranged in the first air duct 1. Starting from the air filter 31, a sensor element 12, an air pump 14, a shut-off valve 22 and then a heater 15 are arranged in the second air duct 2. Alternatively, the sensor element 12 can also be arranged at a different location in the air duct 2 upstream of the heater 15, for example downstream of the air pump 14 or downstream of the shut-off valve 22.

A sensor element 11, which has a mass flow sensor, is provided in the air duct 1. The mass flow sensor measures the mass of air flowing through the air duct 1. Furthermore, a pressure sensor and a temperature sensor can each additionally be provided in the sensor element 11. The pressure in the air duct 1 is measured by the pressure sensor. The temperature of the air flowing through the air duct 1 is measured by the temperature sensor. The air flowing through the air duct 1 can flow to the cylinders 10 according to the actuation of the control elements, i.e., the throttle valve 21.

A sensor element 12, which has a mass flow sensor and optionally also a pressure sensor and/or a temperature sensor, is provided in the air duct 2. The mass flow sensor measures the mass of air flowing through the air duct 2. The optional pressure sensor measures the pressure and the optional temperature sensor measures the temperature in the air duct 2.

The mass which flows through the air duct 1 is controlled by the throttle valve 21. For this purpose, a valve flap 33 is actuated in such a way that it controls the air flow. FIG. 1 schematically shows a position of the valve flap 33 longitudinal to the air flow, which represents a completely open valve flap 33 and thus the greatest possible flow through the air duct 1. However, the valve flap 33 can also assume intermediate positions between open and closed, by means of which the amount of air that is taken in by the cylinders 10 of the internal combustion engine is controlled.

The amount of air flowing through the air duct 2 is determined by the air pump 14 and the shut-off valve 22. Only when the air pump 14 is switched on is a negative pressure generated which leads to a flow in the second air duct 2. Furthermore, the amount of air flowing through the air duct 2 can be influenced depending on the position of a valve flap 34 of the shut-off valve 22. The amount of air can be influenced by the delivery rate of the air pump 14 and the position of the valve flap 34. In a particularly simple embodiment, the valve flap 34 can only assume the completely open position or the completely closed position, and the air quantity is controlled only by the delivery rate or rotational speed of the air pump 14. In the representation in FIG. 1, the valve flap 34 is arranged longitudinally or in a laminar manner relative to the air flow, which corresponds to a fully open shut-off valve 22. In the representation in FIG. 1, an air flow through the air duct 2 toward the heater 15 is thus provided.

The cylinders 10 and the heater 15 are each connected to an exhaust system 35 so that the exhaust gases of the cylinders 10 and of the heater 15 are routed through the exhaust system 35. Catalytic converters 13 and at least one lambda sensor 19 are provided in the exhaust system 35. The catalytic converters 13 may have a plurality of partial catalytic converters, for example a first and a second three-way catalytic converter, a particle filter, and a catalytic converter for NOx reduction. The precise function and arrangement of the partial catalytic converters is not important for understanding the present invention. The residual oxygen content in the exhaust gas of the cylinder 10 is determined by the lambda sensor 19. It can thus be ensured that the total quantity of fuel introduced into the cylinders 10 is in a stoichiometric ratio to the introduced air, since only in such an operating range is good cleaning of the exhaust gas ensured.

The heater 15 comprises a fuel injector 16 and an igniter 17. The fuel injector 16 is designed as a conventional fuel injection valve and allows a precisely defined quantity of fuel to be introduced into the heater 15 for a heating operation. The igniter 17 is typically designed as a spark plug or as a glow plug for igniting a fuel/air mixture. A further lambda sensor 18 can optionally also be arranged in the connecting pipe between the heater 15 and the exhaust system 35 for measuring the oxygen content in the exhaust gas of the heater 15, by means of which further lambda sensor it can be ensured that the quantity ratios of air and fuel in the heater 15 correspond to a desired setpoint value.

Typically, the heater 15 is switched on before the internal combustion engine 40 is started or during an early operating phase of the internal combustion engine. For example, the start-up of an internal combustion engine can be delayed and initially only an operation of the heater 15 take place. A heating of the exhaust system 35 is thus already achieved before an internal combustion engine is started. As a result of this measure, cleaning of the exhaust gas is already allowed in early operation of the internal combustion engine, since it is not necessary to wait until the exhaust gases of the cylinders 10 reach the operating temperature of the catalytic converters 13 for converting the exhaust gases in the exhaust system 35. A start-up of the internal combustion engine is therefore delayed for a short time (for example 1 to 10 seconds) in order to ensure a minimum temperature of the exhaust system at a start-up of the internal combustion engine. Typically, a second operating phase then takes place in which the internal combustion engine is already being operated by combustion processes in the cylinders and, at the same time, heating by the heater 15 is also taking place. A further rapid heating of the exhaust system 35 up to an optimal operating temperature of the catalytic converters 13 is thereby ensured. In a third continuous operation of the combustion in the cylinders 10, it is possible for the heater 15 then not to be operated further. If operating phases occur with insufficient heat introduction into the exhaust system 35 during further operation of the internal combustion engine, the heater can be activated again.

For controlling and diagnosing the device according to FIG. 1, a control device 32 is provided which (via lines not shown here) receives signals from all sensors and sends signals for controlling all control elements. The control device 32 processes the sensor signals and calculates control signals for the control elements. Accordingly, the diagnostic functions described below are executed by the control device 32. The control device 32 can also be a part of a large control device which can be a wide variety of control tasks for the operation of the internal combustion engine or of a vehicle in which the internal combustion engine is installed.

FIG. 1 shows an internal combustion engine, in which the valve plate 33 of the throttle valve 21 shown open and the valve plate 34 of the shut-off valve 22 also shown open. This is thus an operating state of the internal combustion engine 40 in which the cylinders 10 and the heater 15 are simultaneously supplied with air. Such an operating state is useful for achieving a further heating of the exhaust system 35 up to an optimal operating temperature for the catalytic converters 13. After a first heating of the exhaust system 35 to a minimum temperature from which the catalytic converters 13 operate (emissions already converted to parts), a further heating up to the optimal temperature is effected by a simultaneous heating with exhaust gases of the cylinders 10 and of the heater 15. Furthermore, such an operating state can make sense if only a small amount of heat is introduced by the cylinders 10 into the exhaust system during normal operation. This can be the case, for example, in longer overrun phases (for example, driving downhill, no heat release into the exhaust system 35, resulting in rapid cooling) or even in lower partial-load operation (for example, stop-and-go operation, start-stop operation, idling operation) if only small quantities of fuel are introduced into the cylinders 10, which results in reduced heat release/exhaust gas temperatures of the internal combustion engine 40.

It has now been found that, in this operating state, in which the cylinder(s) 10 and the heater 15 are supplied with air simultaneously, a mutual dependence or crosstalk exists between the two flows in the first and second air ducts 1, 2. This mutual dependence of the two flows would lead to a falsification of the expected air flow in the first and second air ducts 1, 2 and is therefore taken into account according to the preseinvention. The flow of air through the second air duct 2 is substantially constant after a possible run-up of the air pump 14. A typical value would here be an amount of air of 30 kg/h. The amount of air through the air duct 1 varies very strongly with the power generated by the cylinders 10. In an idle state of the internal combustion engine, the air requirement of the cylinders 10 is in the order of magnitude of approximately kg/h, while several 100 kg/h are required during full-load operation. Furthermore, an exhaust gas backpressure in the exhaust system 35 changes depending on the air requirement of the cylinders 10. If air thus flows simultaneously through the first and second air ducts 1, 2, the mutual influence of the air flowing through the first and second air ducts must be taken into account.

As stated above, in a first operating state, air only flows through the second air duct 2 to the heater 15 in order to heat the exhaust system 35 before a start-up of the internal combustion engine in order to ensure at least a partial function of the catalytic converters. In this first operating state, only the air flow through the second air duct 2 therefore must be taken into account, which typically takes place by a simple measuring function which represents the relationship between the measured signal of the sensor element 12 and the air requirement of the heater 15. This measuring function can, for example, take place by a characteristic map, i.e., a table, in which an air flow to the heater 15 is assigned to a corresponding measurement signal of the mass flow sensor in the sensor element 12.

In a third operating state, air only flows through the first air duct to the cylinder(s) 10, which corresponds to normal operation of the internal combustion engine without additional operation of the heater 15. In this third operating state, a measuring function which represents the relationship between an air requirement of the cylinders 10 and the measurement signal of the mass flow sensor in the sensor element 11 can also be easily ascertained. This measuring function can also take place using a simple characteristic map.

In the second operating state, when the cylinders 10 and the heater 15 are simultaneously supplied with air, the measuring function must be taken into account a mutual influence of the air flow through the first and second air ducts 1, 2. In this case, the geometric arrangement of the first and second air ducts 1, 2 relative to the air filter 31 must also be taken into account.

Figure 2A:
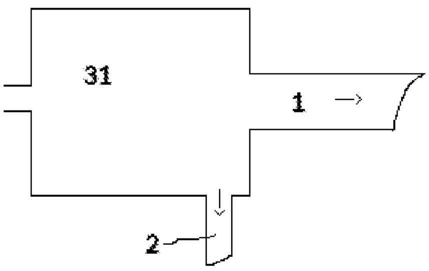
FIG. 2A shows an air filter and a first and a second air ducts which are connected to the air filter and arranged forming an angle to one another.
Figure 2B:
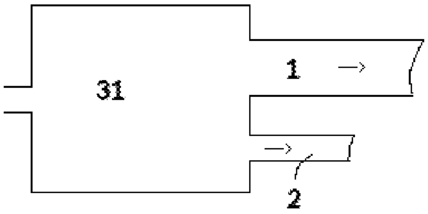
FIG. 2B shows an air filter and a first and a second air duct, which are connected to the air filter arranged in parallel with one another.

In FIGS. 2A and 2B, different arrangements of the first and second air ducts 1, 2 relative to the air filter 31 are shown. The air ducts 1, 2 each have a longitudinal extent which is oriented along the flow direction of the air. Typically, the air ducts are designed as elongate pipes having an approximately round cross-section. However, other cross-sections are also possible, for example, rectangular, square or oval. Furthermore, the elongate pipes can also have bends or curves, which result from the geometric requirements of the internal combustion engines. In FIG. 2A, the air ducts 1, 2 are connected to the air filter 31 such that the respective longitudinal extents of the air ducts 1, 2 form an angle of approximately 90° to one another. In FIG. 2B, the air ducts 1, 2 are connected to the air filter 31 such that the respective longitudinal extents of the air ducts 1, 2 are arranged in parallel with one another.

It has been found that the dependencies of the influence of the flow of the first and second air ducts 1, 2 depend on the relevant geometry. In an arrangement according to FIG. 2A, the flows through the air ducts 1, 2 influence one another to a very large extent. In the arrangement according to FIG. 2B, the mutual influence of the flows through the air ducts 1, 2 is significantly reduced. It is therefore desirable to preferably select a geometric arrangement of the air ducts 1, 2 relative to the air filter 31 in which the mutual influence of the flow through the air ducts 1, 2 is significantly reduced. Since this also depends on the geometry of the air filter 31, a geometric arrangement in which the mutual influence of the air flowing through the first and second air ducts 1, 2 is minimized must therefore be selected in each case empirically, i.e., by trial and error or a possible simulation, when the air ducts 1, 2 are adapted to the air filter 31. Of course, further boundary conditions, in particular the geometric possibilities of arranging the air ducts 1, 2 and air filter 31 in a specific internal combustion engine, must also be taken into account. If the first and second air ducts have longitudinal extents, in particular if the air ducts are designed as elongate pipes, a parallel arrangement of the longitudinal extents (i.e., of the longitudinal axes of the pipes) is advantageous.

Figure 3:
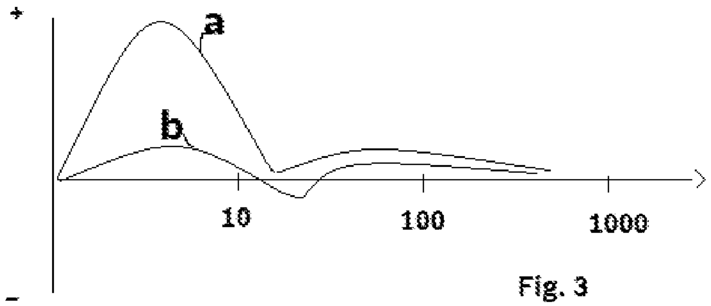
FIG. 3 is a diagram which represents the mutual influence of the flow through the first and second air ducts.

FIG. 3 shows the mutual influence of the air flow in the first and second air ducts in a diagram. The amount of air required by the cylinders 10 is plotted to the right. As stated above, the heater 15 is generally operated with a fixed amount of air. The decisive parameter that causes a change is therefore the amount of air required by the cylinders 10. The target amount of air of the cylinders 10 is therefore plotted to the right, in a logarithmic scale in kilograms per hour (kg/h). To the top and bottom, a percentage deviation of the measured amount of air of the mass flow sensor in the measuring elements 11, 12 is plotted against an individual operation with only a flow in the first air duct 1. The curve a represents the ratios in the geometric arrangement according to FIG. 2A. The curve b represents the dependence in the geometric arrangement according to FIG. 2B. As can be seen, a strong mutual dependence of the measured signal on the amount of air supplied to the cylinders 10 is given in a region with a small amount of air supplied to the cylinders 10. This is because, in this region, the amount of air flowing through the first and second air ducts 1, 2 is approximately in the same order of magnitude so that there is a strong dependence on any changes in the amount of air flowing to the cylinders 10. Furthermore, a simple comparison of the curves a and b shows the reduced influence of the two flows in the arrangement according to FIG. 2B.

Different measuring functions can be used depending on the operating state of the internal combustion engine. The efforts respectively involved in the compensation of the deviations of the flow through the first and second air ducts 1, 2 are different.

Figure 4A:
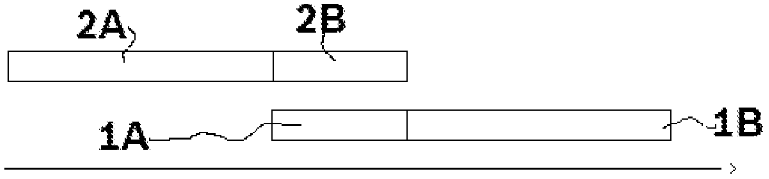
FIG. 4A shows the use of a measuring function depending on the operating state of the internal combustion engine.
Figure 4B:
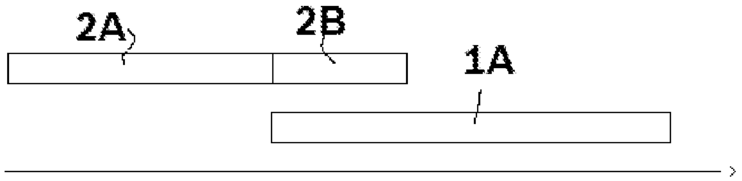
FIG. 4B shows the use of a measuring function depending on the operating state of the internal combustion engine.
Figure 4C:
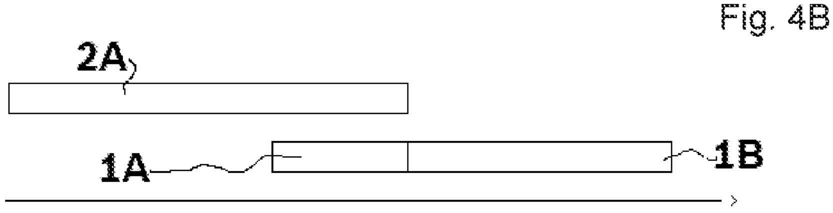
FIG. 4C shows the use of a measuring function depending on the operating state of the internal combustion engine.

In FIGS. 4A, 4B and 4C, the time is in each case plotted to the right and the duration of the air flow in duct 2 and duct 1 is in each case plotted by the bars shown. Simultaneous flow through both air ducts takes place only in a partial region in the center.

In a particularly complex variant of FIG. 4A, a different measuring function 1A, 1B is used in each case for the flow through the first air duct for the second and third operating states. Likewise, a different measuring function 2A, 2B is used in each case for the flow through the second air duct for the first and second operating states.

A certain simplification is achieved in FIG. 4B if the same measuring function 1A is used for the flow through the first air duct 1 for the second and third operating states. This could in particular be harmless since, in both operating states, the amount of air flowing through the first air duct 1 is significantly greater than the amount of air flowing through the second air duct 2. However, for the regulation of the flow through the second air duct, a different measuring function 2A, 2B is in each case used in the first and second operating states in order to take into account the changed operating conditions in the second operating state for the heater 15.

Another simplification of FIG. 4C can consist in that different measuring functions 1A, 1B are used for the flow through the first air duct for the second and third operating states. In contrast, for the regulation of the flow through the second air duct, the same measuring function 2A is used for the first and second operating states. This could in particular be harmless since the same amount of air is supplied to the heater 15 in both operating states.

The selection of the adaptation of the measuring functions to the respective operating states is primarily a question of the effort and the technical advantages achieved therewith or the acceptance of technical disadvantages.

What is claimed is:

1. A method for operating an internal combustion engine which includes a first air duct for supplying air to a cylinder of the internal combustion engine and a second air duct for supplying air to a heater for heating an exhaust system of the internal combustion engine, the first and second air ducts each having at least one control element configured to control an amount of air flowing through them and a respective mass flow sensor configured to measure the amount of air flowing through them, a measuring function assigns an amount of air flowing through the first and second air duct to respective measurement signals of the respective mass flow sensor, the first and second air ducts being connected to a common air filter, for providing filtered ambient air of the internal combustion engine, the method comprising:

regulating the amount of air flowing through the first and second air ducts takes place using the measurement signal of the respective mass flow sensors, depending on operating states of the internal combustion engine, and mutual influence of the air flowing through the first or second air duct is taken into account.

2. The method according to claim 1, wherein air flows only through the second air duct for a first operating mode of the internal combustion engine, air flows through the first and second air ducts for a second operating mode of the internal combustion engine, and air flows only through the first air duct for a third operating mode of the internal combustion engine.

3. The method according to claim 2, wherein, for the regulation of the amount of air flowing through the first air duct, different measuring functions are used for the second operating mode and third operating mode of the internal combustion engine, and for the regulation of the amount of air flowing through the second air duct, the same measuring functions are used for the first operating mode and second operating mode of the internal combustion engine.

4. The method according to claim 2, wherein for the regulation of the amount of air flowing through the first air duct, the same measuring functions are used for the second operating mode and third operating mode of the internal combustion engine, and for the regulation of the amount of air flowing through the second air duct, different measuring functions are used for the first operating mode and second operating mode of the internal combustion engine.

5. The method according to claim 2, wherein, for the regulation of the amount of air flowing through the first air duct, different measuring functions are used for the second operating mode and third operating mode of the internal combustion engine, and for the regulation of the amount of air flowing through the second air duct, different measuring functions are used for the first operating mode and second operating mode of the internal combustion engine.

6. A device configured to operate an internal combustion engine including a first air duct for supplying air to a cylinder of the internal combustion engine and a second air duct for supplying air to a heater for heating an exhaust system of the internal combustion engine, the first and second air ducts each having at least one control element configured to control an amount of air flowing through them and a respective mass flow sensor configured for measuring the amount of air flowing through them, the first and second air ducts being connected to a common air filter, for providing filtered ambient air of the internal combustion engine, the device comprising:

an arrangement configured to regulate the amount of air flowing through the first and second air ducts using the measured signals of the respective mass flow sensors, depending on operating states of the internal combustion engine, and, in doing so, to take into account a mutual influence of the air flowing through the first or second air duct.

7. An air system configured to supply air to an internal combustion engine, comprising:

a first air duct for supplying air to a cylinder of the internal combustion engine; and a second air duct configured to supply air to a heater for heating an exhaust system of the internal combustion engine, the first and second air ducts each having at least one control element for controlling the amount of air flowing through them and a respective mass flow sensor for measuring the amount of air flowing through them, the first and second air ducts being connected to a common air filter, for providing filtered ambient air of the internal combustion engine, wherein an arrangement of the connection of the first and second air ducts to the air filter is selected such that a mutual influence of the air flowing through the first or second air duct is minimized.

8. The air system according to claim 7, wherein the first and second air ducts have longitudinal extents, and the first and second air ducts are connected to the air filter in parallel with one another with their longitudinal extents.

* * * * *